(12) United States Patent
Morita et al.

(10) Patent No.: US 9,381,883 B2
(45) Date of Patent: Jul. 5, 2016

(54) FRONT VEHICLE-BODY STRUCTURE OF VEHICLE

(71) Applicant: MAZDA MOTOR CORPORATION, Hiroshima (JP)

(72) Inventors: Yasuhiro Morita, Hatsukaichi (JP); Takahiro Hirano, Hiroshima (JP); Hitoshi Ochimizu, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/520,703

(22) Filed: Oct. 22, 2014

(65) Prior Publication Data
US 2015/0145237 A1    May 28, 2015

(30) Foreign Application Priority Data
Nov. 22, 2013   (JP) ................................ 2013-241672

(51) Int. Cl.
| | |
|---|---|
| *B62D 21/15* | (2006.01) |
| *B60R 21/203* | (2006.01) |
| *B62D 25/14* | (2006.01) |

(52) U.S. Cl.
CPC ............ *B60R 21/203* (2013.01); *B62D 25/145* (2013.01); *B62D 25/147* (2013.01)

(58) Field of Classification Search
CPC .... B62D 25/147; B62D 25/145; B62D 1/197; B62D 1/195; B62D 1/19; B62D 21/15
USPC ..................................... 280/779; 296/193.02
See application file for complete search history.

(56) References Cited

U.S. PATENT DOCUMENTS

| 4,362,319 A | * | 12/1982 | Masaki | ................ | B62D 25/145 |
|---|---|---|---|---|---|
| | | | | | 280/779 |
| 8,622,464 B2 | * | 1/2014 | Atsumi | ................ | B62D 25/145 |
| | | | | | 296/193.02 |

(Continued)

FOREIGN PATENT DOCUMENTS

| FR | WO 2011058270 A1 | * | 5/2011 | ........... | B62D 25/145 |
|---|---|---|---|---|---|
| JP | WO 2013089034 A1 | * | 6/2013 | ........... | B62D 25/145 |

(Continued)

OTHER PUBLICATIONS

Da Costa Pito et al., Motor Vehicle Dashboard Structure and Motor Vehicle Including Such a Structure, May 19, 2011, EPO, WO 2011-058270 A1, English Abstract.*

(Continued)

*Primary Examiner* — James English
(74) *Attorney, Agent, or Firm* — Studebaker & Brackett PC (57) ABSTRACT

A steering member comprises a beam member extending in a vehicle width direction, a steering bracket supporting a steering device, and side brackets fixed to hinge pillars. The beam member includes a weak portion provided between the steering bracket and the side brackets on a driver-seat side and configured to be weak against a load inputted in a vehicle longitudinal direction, and an extension portion provided to extend toward a vehicle outward side beyond the side bracket provided on a passenger-seat side and configured to prevent the steering member receiving the input load from sliding toward the passenger-seat side by contacting the hinge pillar. Accordingly, the steering device can be prevented from moving inward in a vehicle frontal collision, thereby restraining a passenger with an airbag properly.

8 Claims, 8 Drawing Sheets

(56) References Cited

U.S. PATENT DOCUMENTS

| | | | | |
|---|---|---|---|---|
| 2004/0135400 | A1* | 7/2004 | Matsuzaki | B29C 45/14598 296/193.02 |
| 2010/0001552 | A1* | 1/2010 | Kim | B62D 25/147 296/193.02 |
| 2011/0254316 | A1* | 10/2011 | Watanabe | B62D 25/147 296/193.02 |
| 2012/0049574 | A1* | 3/2012 | Atsumi | B62D 25/145 296/193.02 |
| 2014/0319812 | A1* | 10/2014 | Fukushima | B62D 25/145 280/779 |
| 2014/0333094 | A1* | 11/2014 | Matsushita | B62D 25/145 296/193.02 |

FOREIGN PATENT DOCUMENTS

| | | | | |
|---|---|---|---|---|
| JP | WO 2013108304 | A1 * | 7/2013 | B62D 25/145 |
| WO | 2013/108304 | A1 | 7/2013 | |

OTHER PUBLICATIONS

Da Costa Pito et al., Motor Vehicle Dashboard Structure and Motor Vehicle Including Such a Structure, May 19, 2011, EPO, WO 2011-058270 A1, Machine Translation of Description.*

* cited by examiner

FRONT VEHICLE-BODY STRUCTURE OF VEHICLE

BACKGROUND OF THE INVENTION

The present invention relates to a front vehicle-body structure of a vehicle which comprises a steering member supporting a steering device provided an airbag and extending in a vehicle width direction.

In general, in a case in which a hinge pillar retreats or deforms, falling down inward, in an offset collision, a steering member joined to the hinge pillar via a side bracket tends to bend vehicle rearward with a support point located near a center stay.

This rearward bending of the steering member causes a steering device supported at the steering member to move inward in the vehicle width direction, so that there is a concern that a restraint position of a passenger with the airbag provided at the steering device may improperly move toward the inward side in the vehicle width direction. In particular, this concern becomes notable in a pole collision or a small-overlap frontal collision of the vehicle.

International Application Publication No. WO2013/108304 A1, for example, discloses a structure in which the steering member includes a weak portion provided between a driver-seat-side side bracket and a steering support portion, which is made to bend first in a vehicle frontal collision, so that the steering device can be prevented from moving inward in the vehicle width direction.

Herein, the steering member is fixed to the hinge pillar at the side bracket provided at an end portion of a beam member constituting the steering member. That is, the end portion of the steering member is fixed to the hinge pillar via the side bracket, so that a gap is generated between an end face of the beam member and the hinge pillar.

In particular, in a case in which the width (lateral length) of the steering member is set to be shorter than the width of a vehicle body, that is—the distance between attachment portions of the both-side hinge pillars where the steering member is attached in order to facilitate assembling of the steering member, one of the side brackets is arranged to contact the hinge pillar vehicle-body, and the other of the side brackets is fixed to the vehicle-body by using a fastening member having a length adjusting member, such as an adjustable nut, disclosed in Japanese Patent Laid-Open Publication No. 2007-182169, for example, to diminish a gap formed between the other of the side brackets and the hinge pillar, the gap is generated between an end face of the steering member and the hinge pillar.

In a case in which the gap is generated between the end face of the beam member constituting the steering member and the hinge pillar as described above, when the driver-seat-side hinge pillar falls down inward in the vehicle frontal collision, the side bracket fixed to the hinge pillar deforms, so that the steering member slides easily toward the passenger-seat side in the vehicle width direction.

Further, in the case in which the side bracket deforms greatly, even if the steering member including the weak portion disclosed in the above-described first patent document is used, a load inputted to the steering member disperses improperly, so that the weak portion cannot be made to bend efficiently. Accordingly, there is a concern that the steering member may bend vehicle rearward, so that the steering device may move greatly inward in the vehicle width direction.

SUMMARY OF THE INVENTION

An object of the present invention is to provide a simple front vehicle-body structure of a vehicle which can prevent the steering device from moving inward in the vehicle width direction in the vehicle frontal collision, thereby restraining (protecting) the passenger with the airbag properly.

According to the present invention, there is provided a front vehicle-body structure of a vehicle, comprising a steering device provided with an airbag, and a steering member extending in a vehicle width direction and supporting the steering device, wherein the steering member comprises a beam member extending in the vehicle width direction, a steering support portion supporting the steering device, and a pair of side brackets provided at both-side ends of the beam member and fixed to a pair of vehicle-body side portions, and the beam member includes a weak portion and an extension portion, the weak portion being provided between the steering support portion and a driver-seat-side side bracket of the pair of side brackets and configured to be weak against a load inputted, in a vehicle longitudinal direction, to a driver-seat-side vehicle-body side portion of the pair of vehicle-body side portions, the extension portion being provided to extend toward a vehicle outward side beyond a passenger-seat-side side bracket of the pair of side brackets and configured to prevent the steering member receiving the input load from sliding toward a passenger-seat side by contacting the passenger-seat-side vehicle-body side portion.

According to the present invention, the steering device provided with the airbag can be prevented from moving inward in the vehicle width direction with a simple structure. Specifically, since the extension portion is provided at the beam member to extend toward the vehicle outward side beyond the passenger-seat-side side bracket, even when the driver-seat-side vehicle-body side portion falls down inward in the vehicle frontal collision, the extension portion comes to contact the passenger-seat-side vehicle-body side portion in an early stage of deformation starting, that is, the extension portion has a first contract of the extension portion with the passenger-seat-side vehicle-body side portion, so that it can be properly prevented that the steering member moves toward the passenger-seat side in the vehicle width direction because of deformation of the side bracket.

Further, since the extension portion contacts the vehicle-body side portion directly, the load is efficiently inputted to the beam member including the weak portion, so that the deformation of the weak portion can be promoted. Thereby, the steering member can be prevented properly from bending vehicle rearward.

As described above, the above-described structure can prevent the steering device from moving inward in the vehicle width direction with a simple structure. In particular, when considering the case of the pole collision of the vehicle in which retreating or deforming of falling down inward of the hinge pillar become notable or the small-overlap frontal collision of the vehicle, any other measures to prevent another portion from deforming, such as reinforcing or increasing plate thickness, which is applied additionally to the structure disclosed in the above-described first patent document, may cause improper costs or weight increases. According to the above-described present invention, however, the steering member can be properly prevented from moving toward the passenger-seat side in the vehicle width direction, or the steering member can be properly prevented from bending vehicle rearward by promoting deformation of the weak portion with minimum measures, without applying the above-described additional measures. Accordingly, the structure according to the present invention can properly prevent the steering device from moving inward in the vehicle width direction, so that any concern that the restraint (protection) position of the passenger with the airbag provided at the steering device may improperly move toward the inward side in the vehicle width direction can be prevented surely.

Herein, the above-described extension portion may be configured such that its end face projects outward in the vehicle width direction beyond the side bracket as long as it extends toward the vehicle outward side beyond the attachment position of the passenger-seat-side side bracket to the beam member. Further, the extension portion may be configured not to extend toward the vehicle outward side in the vehicle width direction from the entire part of the side bracket by arranging that inward from a flange portion of the side bracket which contacts the vehicle-body side portion, for example.

Also, the extension portion may be configured by being formed integrally at the steering member, that is, by attaching the side bracket at a specified-long position of the beam member apart from its passenger-seat-side end face, or by attaching the side bracket at the passenger-seat-side end portion of the beam member and by attaching another member having a strength equivalent to or greater than that of the beam member at a position where the beam member extends toward the vehicle outward side beyond the side bracket.

Additionally, the extension portion may be configured to be spaced apart from or contact the vehicle-body side portion, such as the hinge pillar, in its setting (initial) state as long as it comes to contact the vehicle-body side portion (the hinge pillar) to prevent deformation of the side bracket or promote deformation of the weak portion against the vehicle-body side portion which retreats or deforms, falling down inward, in the offset collision.

According to an embodiment of the present invention, a distance in the vehicle width direction between the pair of side brackets is configured to be shorter than that between the pair of vehicle-body side portions, the passenger-seat-side side bracket is fixedly fastened to the passenger-seat-side vehicle-body side portion by using a fastening member having a length adjustable means, and a vehicle-outward end portion of the fastening member in a state in which a length of the length adjustable means is set to be short and a vehicle-outward end portion of the extension portion are arranged substantially at the same position in the vehicle width direction. Thereby, it can be prevented that the steering device and the airbag move inward in the vehicle width direction, providing an appropriate installment of the steering member to the vehicle. Specifically, by arranging one of the side brackets to contact the vehicle-body side portion in a state in which the steering member is disposed at a specified installment position, some gap is ensured between the passenger-seat-side vehicle-body side portion and the vehicle-outward end portion of the fastening member or the vehicle-outward end portion of the extension portion in the state in which the length of the length adjustable means is set to be short. Accordingly, the installation of the steering member to the vehicle can be improved. Further, even in a case in which the gap for improving the vehicle installment is generated like this, since the extension portion is provided as described above, the extension portion comes to contact the passenger-seat-side vehicle-body side portion first when the driver-seat-side vehicle-body side portion falls down inward in the vehicle frontal collision. Therefore, it can be prevented properly that the steering member moves toward the passenger-seat side in the vehicle width direction because of deformation of the side bracket, and also it can be prevented properly that the steering member bends vehicle rearward.

According to another embodiment of the present invention, the weak portion is constituted by combination of a lateral hole portion extending in the vehicle width direction and a vertical hole portion extending in a vertical sectional direction. Thereby, starting of bending of the beam member can be promoted by the vertical hole portion, and bending of the weak portion can be efficient by adjusting the amount of deformation of the beam member with the lateral hole portion. Accordingly, even in a case in which the steering member is prevented from bending vehicle rearward with the support point located near its center stay, the weak portion bends efficiently, and the driver-seat-side vehicle-body side portion falls down inward in the vehicle frontal collision, the extension portion comes to contact the passenger-seat-side vehicle-body side portion first, so that it can be prevented properly that the steering member moves toward the passenger-seat side in the vehicle width direction because of deformation of the side bracket, and also it can be prevented properly that the steering member bends vehicle rearward.

According to another embodiment of the present invention, a plate portion extending in the vehicle width direction between an inner wall and an outer wall which constitute the passenger-seat-side vehicle-body side portion is provided at a specified position which overlaps the extension portion at least partially in a vehicle side view. Thereby, the rigidity of the vehicle-body side portion constituted by the inner wall and the outer wall can be improved. For example, the deformation of the vehicle-body side portion caused by the vehicle frontal collision can be prevented, and the load in a case of the vehicle-body side portion's falling down inward can be inputted to the steering member efficiently, so that the efficient load input to the weak portion can be promoted.

According to another embodiment of the present invention, a stay member to fix the steering member at a vehicle-body floor is provided at a middle portion, in the vehicle width direction, of the steering member, the beam member comprises a large-diameter pipe arranged on a driver-seat side and a small-diameter pipe arranged on the passenger-seat side, the stay member is fixed to the large-diameter pipe, and a reinforcing member extending in the vehicle width direction from the stay member to the small-diameter pipe is provided. Thereby, the steering member can be reinforced efficiently by reinforcing a cross-section changing portion of the steering member where the stay member fixed to the vehicle-body floor, the large-diameter pipe, and the small-diameter pipe are connected together. Herein, the above-described cross-section changing portion is located substantially at the central position of the steering member and becomes a support point of its bending to be the most easily bendable when receiving the load input caused by the vehicle-body side portion's falling down inward or the like in the frontal collision. Accordingly, without reinforcing the other portion excessively, it can be prevented properly that the steering member moves toward the passenger-seat side in the vehicle width direction, and also it can be prevented properly that the steering member bends vehicle rearward.

Other features, aspects, and advantages of the present invention will become apparent from the following description which refers to the accompanying drawings.

DETAILED DESCRIPTION OF THE INVENTION

Figure 1:
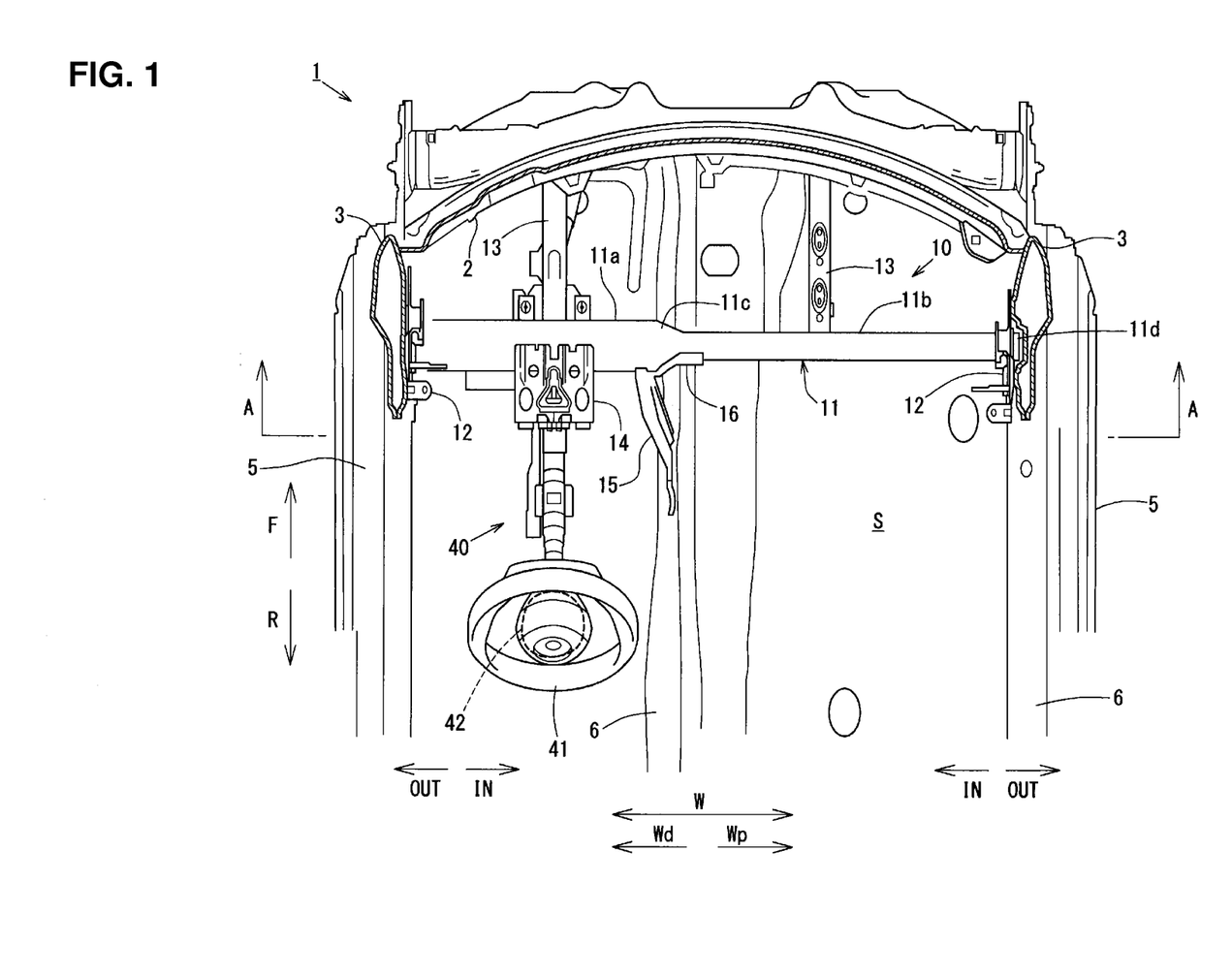
FIG. 1 is a plan view of a front portion of a vehicle having a structure according to an embodiment of the present invention.
Figure 2:
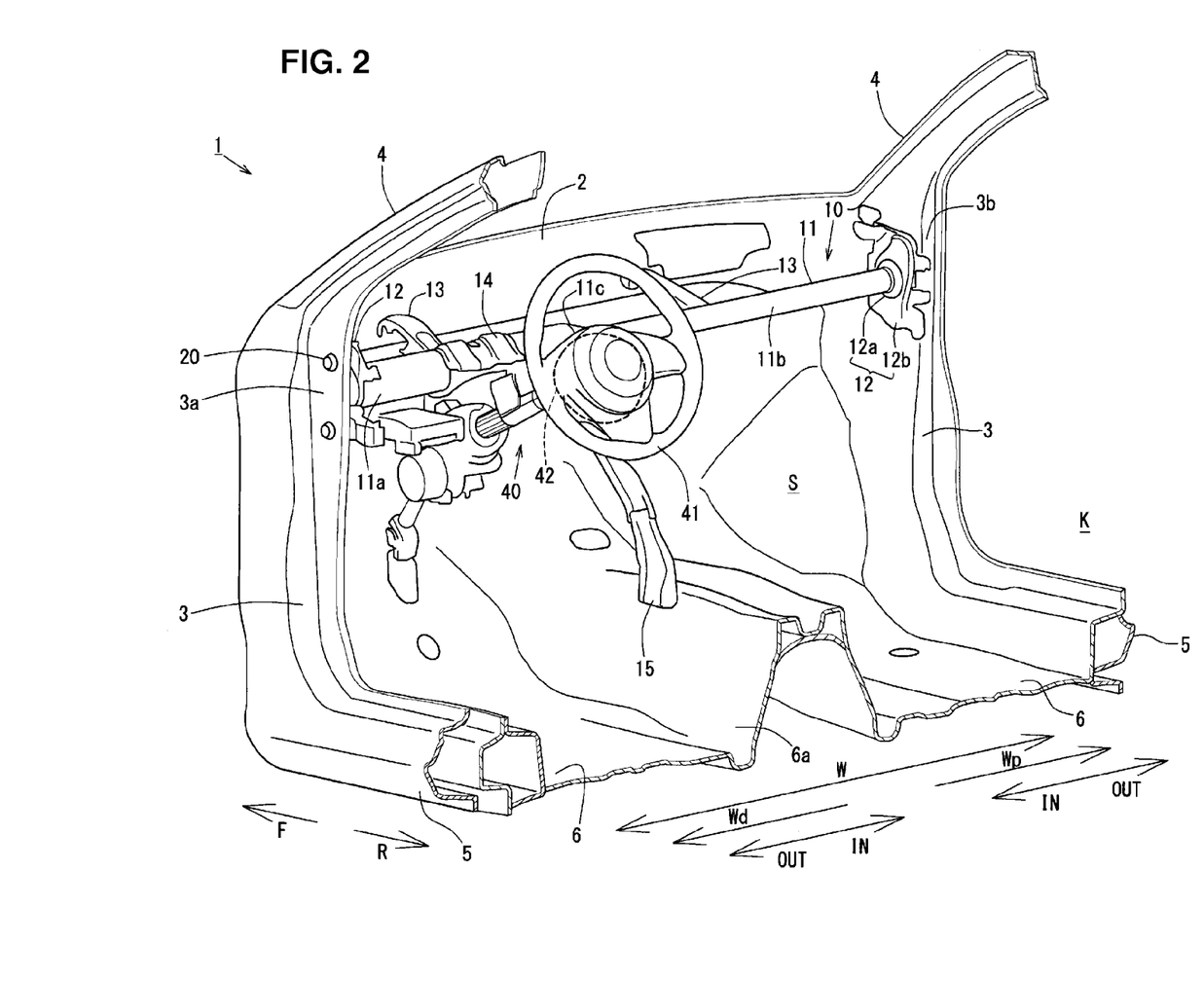
FIG. 2 is a view of a front portion of a vehicle compartment, when viewed from the vehicle rear.

Hereinafter, a preferred embodiment of the present invention will be described referring to the accompanying drawings. FIG. 1 shows a plan view of a front portion of a vehicle 1 having a structure according to the embodiment of the present invention, and FIG. 2 shows a view of a front portion of a vehicle compartment S, when viewed from the vehicle rear. Herein, an arrow F shows a direction of a vehicle-body front side, an arrow R shows a direction of a vehicle-body rear side, an arrow IN shows a direction of an inward side in a vehicle width direction, and an arrow OUT shows a direction of an outward side in the vehicle width direction. Further, an arrow W shows the vehicle width direction, an arrow Wd shows a direction of a driver-seat side of a steering device 40 arranged in the vehicle width direction W, and an arrow Wp shows a direction of a passenger-seat side of the steering device 40 arranged in the vehicle width direction W.

Figure 3:
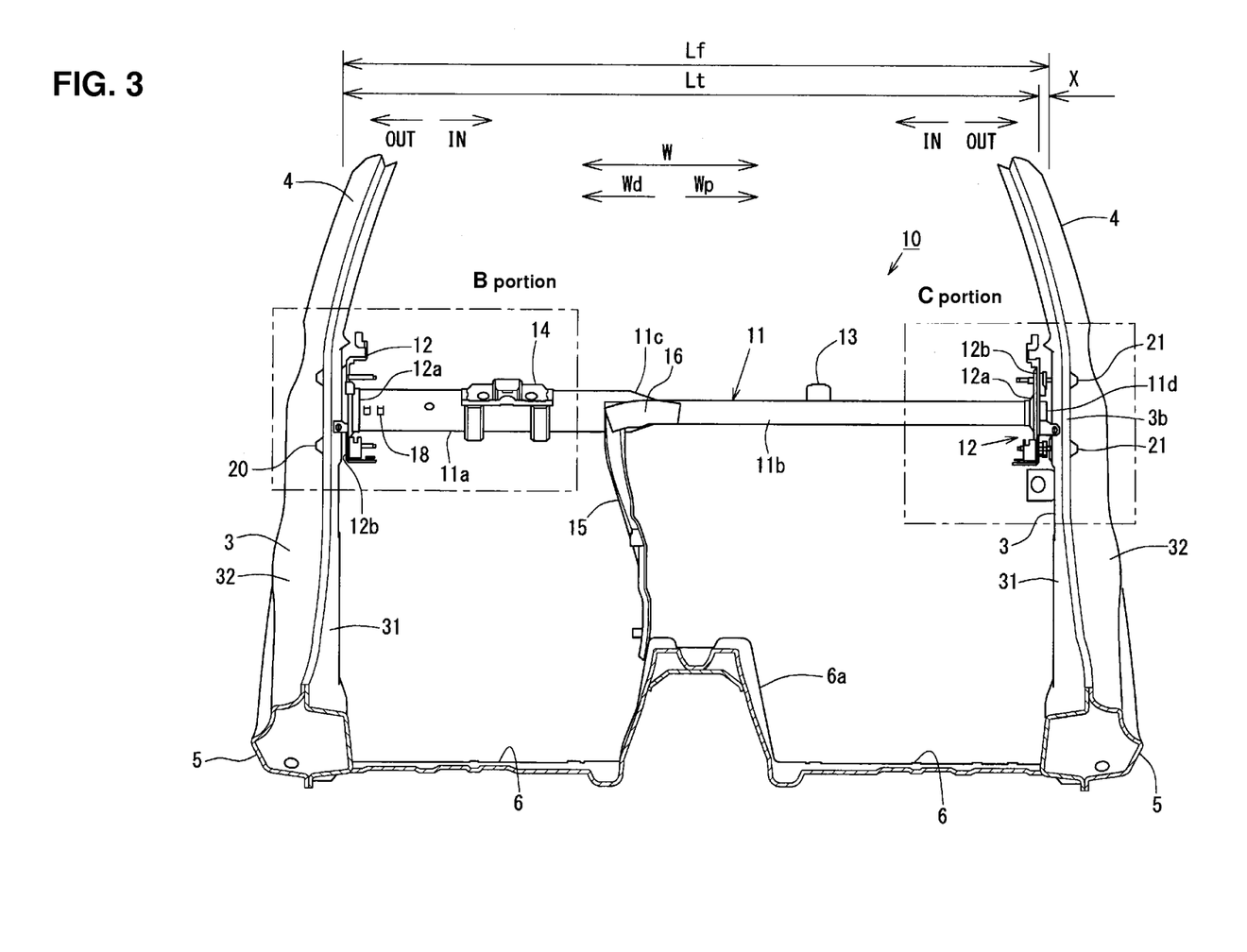
FIG. 3 is a sectional view taken along line A-A of FIG. 1.
Figure 4:
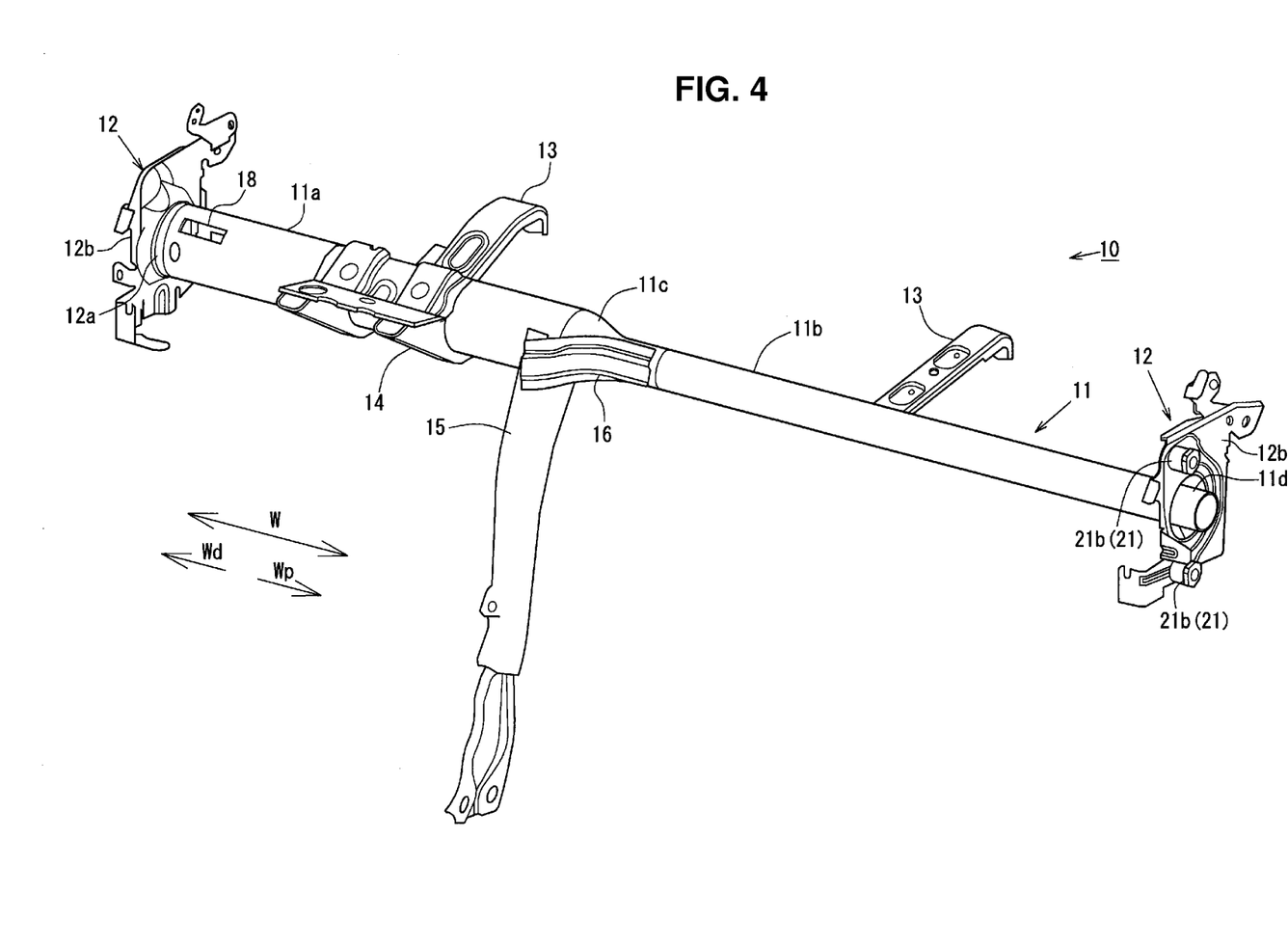
FIG. 4 is a perspective view of a steering member.
Figure 5A:
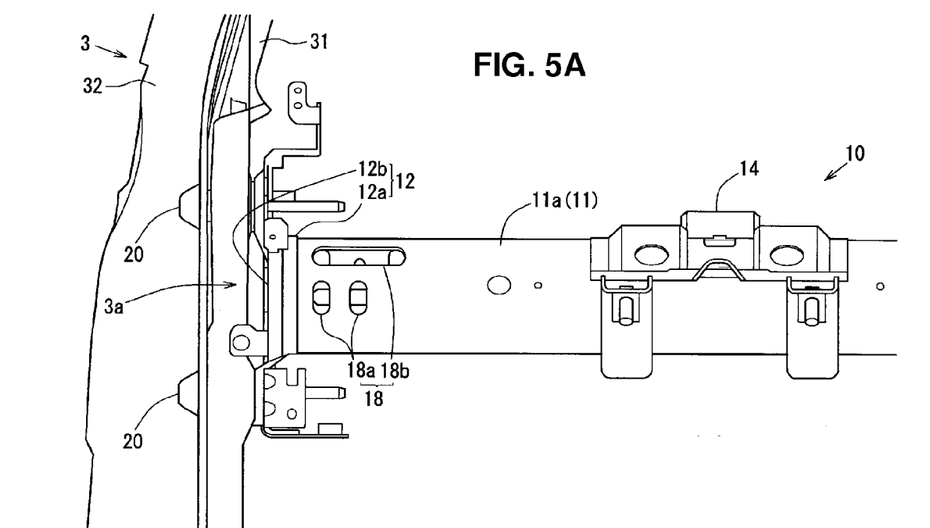
FIGS. 5A and 5B are explanatory diagrams about a B portion in FIG. 3.
Figure 5B:
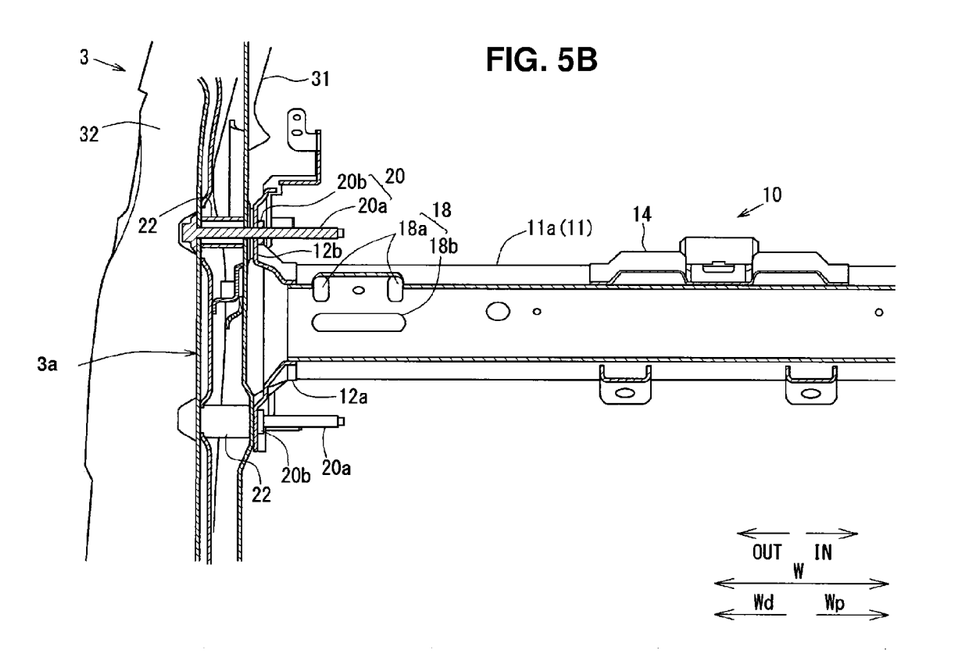
Figure 6A:
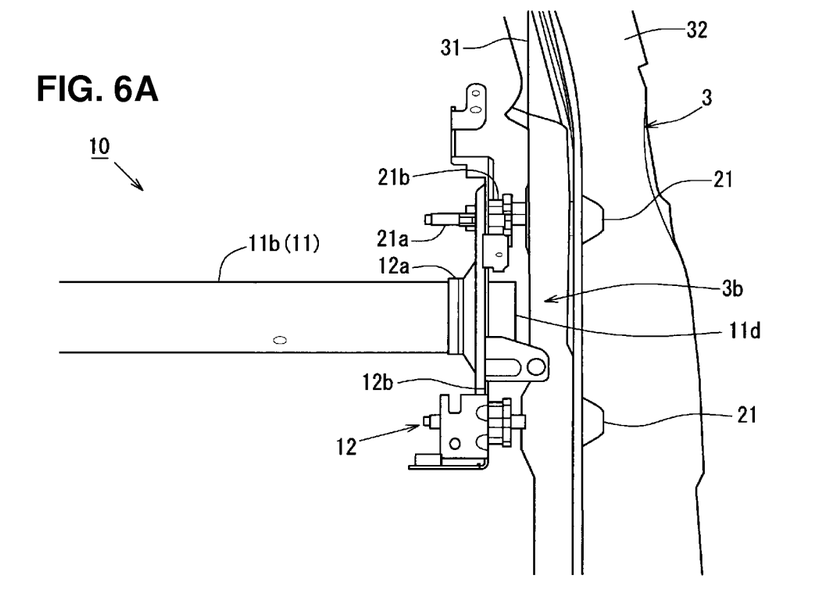
FIGS. 6A and 6B are explanatory diagrams about a C portion in FIG. 3.
Figure 6B:
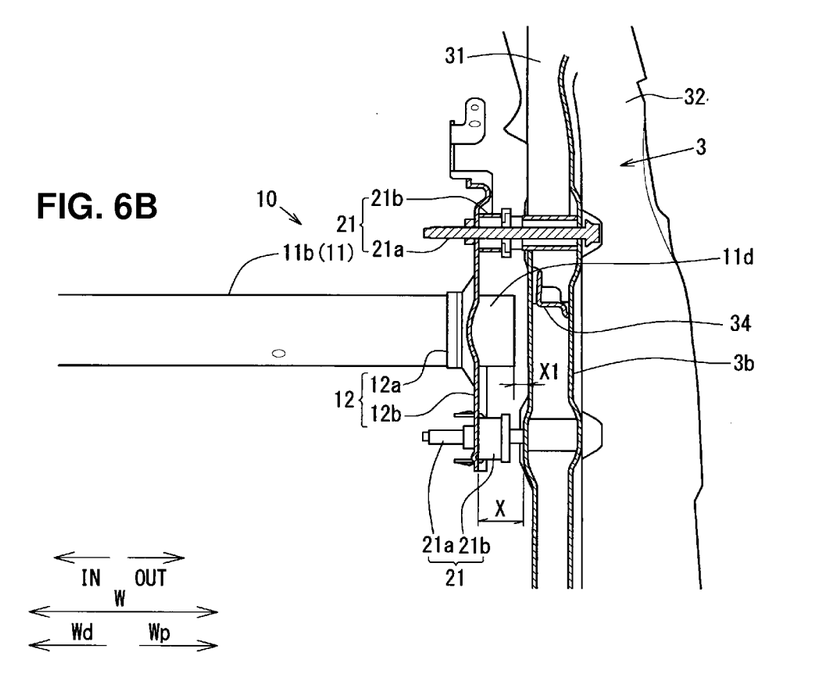
Figure 7:
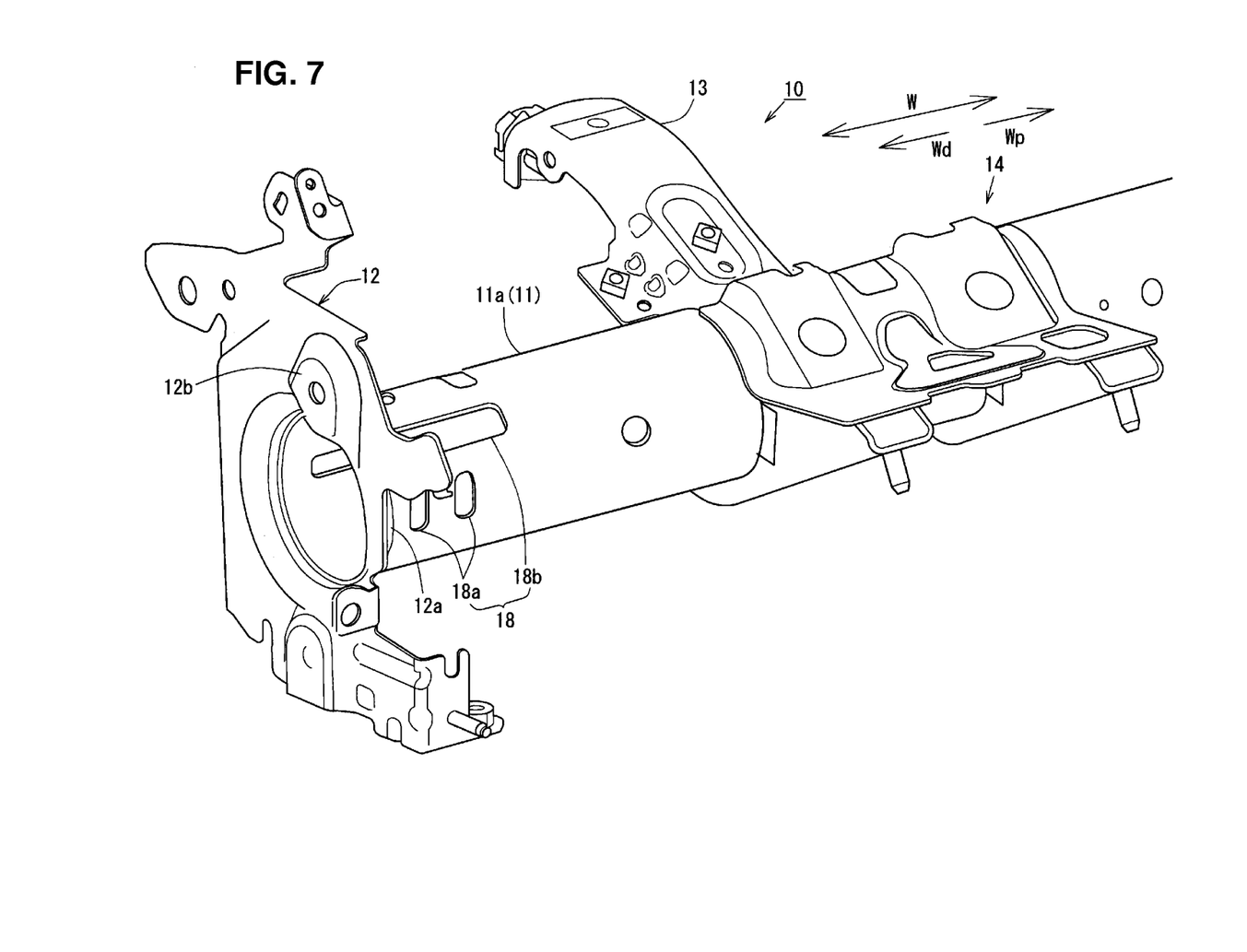
FIG. 7 is an enlarged perspective view of a driver-seat side of the steering member.
Figure 8:
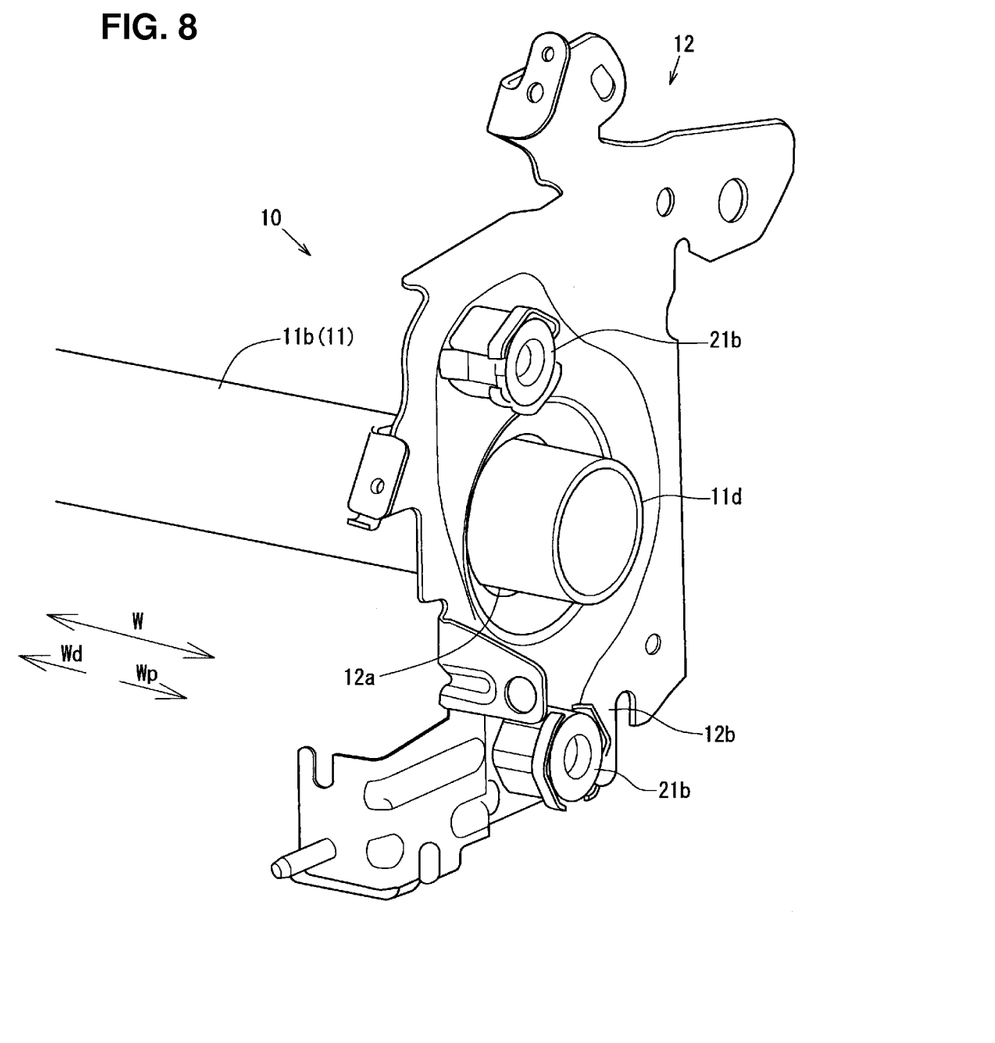
FIG. 8 is an enlarged perspective view of a passenger-seat side of the steering member.

Further, FIG. 3 shows a sectional view taken along line A-A of FIG. 1, FIG. 4 is a perspective view of the steering member 10, FIGS. 5A and 5B show explanatory diagrams about a B portion in FIG. 3, and FIGS. 6A and 6B show explanatory diagrams about a C portion in FIG. 3. Specifically, FIG. 5A shows an enlarged view of the portion B in FIG. 3, and FIG. 5B shows a sectional view of the portion B in FIG. 3. Likewise, FIG. 6A shows an enlarged view of the portion C in FIG. 3, and FIG. 6B shows a sectional view of the portion C in FIG. 3. Moreover, FIG. 7 shows an enlarged perspective view of the driver-seat side Wd of the steering member 10, and FIG. 8 is an enlarged perspective view of the passenger-seat side Wp of the steering member 10.

As shown in FIGS. 1 and 2, the vehicle of the present embodiment comprises a dash panel 2 which partitions the vehicle compartment S from an engine room at a front portion of the vehicle and forms a front-wall portion of the vehicle compartment S.

Further, a pair of right-and-left hinge pillars 3 which extend vertically along side end portions of the dash panels 2 are provided respectively on the outward side OUT of the dash panel 2 at the vehicle front portion. A front pillar 4 (see FIG. 2) is arranged at an upper portion of the hinge pillar 3 such that it slants with its low front portion and its high rear portion. Meanwhile, a pair of right-and-left side sills 5 which extend in a vehicle longitudinal direction are arranged respectively at lower portions of the pair of hinge pillars 3.

Herein, as shown in FIG. 2, a floor face of the vehicle compartment S is formed by a floor panel 6 which is connected to a lower end of the dash panel 2 at its front end, and the above-described side sills 5 are positioned at both-side end portions of the floor panel 6. A side opening portion K (see FIG. 2) is formed by the hinge pillar 3, the front pillar 4, the side sill 5 and others at a side portion of the vehicle compartment S. A front door (not illustrated) which is attached to the hinge pillar 3 via door hinges at its front end is provided to open or close the side opening portion K.

The hinge pillar 3 is mainly comprised of a hinge pillar inner 31 and a hinge pillar outer 32, which form a pillar closed cross section extending in a vehicle vertical direction by joining respective flange portions positioned at front end portions thereof and joining respective flange portions positioned at rear end portions thereof.

Herein, a point of the hinge pillar 3 attached to a driver-seat-side side bracket 12 of a steering member 10, which will be described later, is named a driver-seat-side attachment point 3a, and another point of the hinge pillar 3 attached to a passenger-seat-side side bracket 12 of the steering member 10 is named a passenger-seat-side attachment point 3b. Further, a plate member 34 (see FIG. 6) extending in the vehicle width direction W is provided inside the pillar closed cross section formed by the hinge pillar inner 31 and the hinge pillar outer 32 at a position which corresponds to an extension portion 11d of the steering member 10, which will be described later, at the passenger-seat-side attachment point 3b of the hinge pillar 3 provided on the passenger-seat side Wp.

The steering member 10 supports an instrument panel (not illustrated) arranged at a vehicle front portion and a steering device 40, and this steering member 10 is provided to extend in the vehicle width direction in the vehicle compartment S as shown in FIGS. 1 and 2.

Next, the steering member 10 will be described in detail. The steering member 10 comprises a beam member 11 which extends in the vehicle width direction W, a pair of side brackets 12 which are provided at both-side ends of the beam member 11 and fixed to the hinge pillars 3, a steering bracket 14 which supports the steering device 40 at a central portion of the beam member 11, a pair of cowl brackets 13 which are fixed to the dash panel 2, and a center stay 15 which supports the steering member 10 at the floor panel 6.

The beam member 11 comprises a large-diameter pipe portion 11a which is arranged on the driver-seat side Wd and extends in the vehicle width direction W, a small-diameter pipe portion 11b which is arranged on the passenger-seat side Wp, and a taper portion 11c which becomes gradually slender from the large-diameter pipe portion 11a toward the small-diameter pipe portion 11b.

A weak portion 18 which comprises vertical hole portions 18a to promote starting of bending of the beam member 11 and a lateral hole portion 18b to adjust the amount of deformation of the beam member 11 is formed at the driver-seat side Wd of the large-diameter pipe portion 11a of the beam member 11.

Further, at a position near the center of the large-diameter pipe portion 11a of the beam member 11 are provided one of the cowl brackets 13 projecting toward the vehicle-body front side F and the steering bracket 14 projecting toward the vehicle-body rear side R. At a position near the center of the small-diameter pipe portion 11b of the beam member 11 is provided the other cowl bracket 13 projecting toward the vehicle-body front side F.

Moreover, an upper end of the center stay 15 connected to a center floor panel 6a of the floor panel 6 at its lower end is connected to the passenger-seat side Wp of the large-diameter pipe portion 11a of the beam member 11, and a reinforcing member 16 which connects the center stay 15 connected to the large-diameter pipe portion 11a to the taper portion 11c and the small-diameter pipe portion 11b is provided.

Each of the side brackets 12 to attach the beam member 11 constituted as described above to the hinge pillar 3 comprises an attachment portion 12a which is attached to an outer face of the beam member 11 and a flange portion 12b which is attached to the hinge pillar 3 by a fastening member 20 and a length-adjustable fastening member 21, which will be described later.

One of the side brackets 12 is attached to an end portion of the driver-seat side Wd of the large-diameter pipe portion 11a of the beam member 11, and the other side bracket 12 is attached via the attachment portion 12a to a portion of the passenger-seat side Wp of the small-diameter pipe portion 11b which is located at a specified distance on the vehicle inward side IN away from an end face of the passenger-seat side Wp. Herein, the side brackets 12 are attached to the both ends of the beam member 11 such that the flange portion 12b of each of those is positioned on the outward side OUT relative to the attachment portion 12a.

By attaching the other side bracket 12 via the attachment portion 12a to the portion of the passenger-seat side Wp of the small-diameter pipe portion 11b which is located at the specified distance on the vehicle inward side IN away from the end face of the passenger-seat side Wp as described above, the end portion of the passenger-seat side Wp of the small-diameter pipe portion 11b is configured to project toward the outward side OUT in the vehicle width direction beyond the flange portion 12b of the side bracket 12. And, the extension portion 11d is constituted by the end portion of the beam member 11 projecting toward the outward side OUT beyond the attachment portion 12a of the side bracket 12. Further, the end portion of the passenger-seat side Wp of the extension portion 11 projects toward the outward side OUT beyond the flange portion 12b of the side bracket 12 provided on the passenger-seat side Wp.

Herein, as shown in FIG. 3, a distance Lf between the flange portions 12b of the side brackets 12 provided at the both sides of the steering member 10 is set to be shorter than a distance Lt between the attachment points 3a, 3b of the both-side hinge pillars 3 in the vehicle width direction W. Accordingly, a gap X is generated between the passenger-seat-side attachment point 3b and the passenger-seat-side flange portion 12b, so that the installment of the steering member 10 to the vehicle 1 can be properly ensured.

The beam member 11 described above is attached to the attachment points 3a, 3b of the hinge pillars 3 of the vehicle 1 via the flange portions 12b of the side brackets 12 by the fastening member 20 and the length-adjustable fastening member 21.

Specifically, the beam member 11 is fixedly fastened to the hinge pillar 3 provided on the driver-seat side Wd by the fastening member 20 such that the side bracket 12 contacts the driver-seat-side attachment point 3a. More specifically, a fastening nut 20b provided on the side of the flange portion 12b is fastened to a fastening bolt 20a, into which a spacer 22 (see FIG. 5B) attached to the hinge pillar 3 is inserted, so that the flange portion 12b is fixed to the driver-seat-side attachment point 3a of the hinge pillar 3.

Herein, while the gap X is generated between the passenger-seat-side attachment point 3b and the passenger-seat-side flange portion 12b of the side bracket 12 as shown in FIG. 6B because the distance Lf between the flange portions 12b of the side brackets 12 is set to be shorter than the distance Lt between the attachment points 3a, 3b, this gap X is diminished by expanding the length of a length-adjustable nut 21b, so that the flange portion 12b of the side bracket 12 provided on the passenger-seat side Wp is fastened to a fastening bolt 21a which is inserted into the spacer 22 attached to the hinge pillar 3.

Herein, it is configured such that the end portion of the passenger-seat side Wp of the length-adjustable nut 21b substantially matches the end portion of the passenger-seat side Wp of the extension portion 11d in a state in which the length of the length-adjustable nut 21b disclosed in FIG. 8 is shortened the most. Further, as shown in FIG. 6B, a gap X1 is generated between the end face of the extension portion 11d and the passenger-seat-side attachment point 3b in the installment state.

According to the above-described front vehicle-body structure in which the steering member 10 is attached to the attachment points 3a, 3b of the hinge pillar 3 with the fastening member 20 and the length-adjustable fastening member 21, even when the hinge pillar 3 provided on the driver-seat side Wd falls down inward in the vehicle frontal collision, the extension portion 11d comes to contact the hinge pillar 3 provided on the passenger-seat side Wp in an early stage of the deformation starting, so that it can be prevented that the steering member 10 moves toward the passenger-seat side Wp because of the deformation of the side bracket 12.

Further, since the extension portion 11d contacts the hinge pillar 3 provided on the passenger-seat side Wp even when the hinge pillar 3 provided on the driver-seat side Wd falls down inward in the vehicle frontal collision, the load is efficiently inputted to the beam member 11 including the weak portion 18, so that the deformation of the weak portion 18 can be promoted. Thereby, the steering member 10 can be prevented from bending vehicle rearward.

Accordingly, the above-described simple structure can prevent the steering device 40 provided with the airbag 42 from moving toward the vehicle inward side IN. In particular, when considering the case of the pole collision of the vehicle in which retreating or deforming of falling down inward of the hinge pillar becomes notable or the small-overlap frontal collision (25% offset frontal collision) of the vehicle in which an object collides with 25% part of the vehicle-body front end side of the vehicle, any other measures to prevent another portion from deforming, such as reinforcing or increasing plate thickness, may cause an improper costs or weight increases. According to the above-described structure, however, the steering member 10 can be properly prevented from moving toward the passenger-seat side Wp, or the steering member 10 can be properly prevented from bending vehicle rearward by promoting the deformation of the weak portion 18 with minimum measures, without applying the above-described additional measures. Accordingly, the above-described structure can properly prevent the steering device 40 provided with the airbag 42 from moving toward the vehicle inward side IN, so that any concern that the restraint position of the passenger with the airbag 42 installed at the steering device 40 may improperly move toward the vehicle inward side IN can be properly prevented.

Further, according to the above-described structure, the distance Lf between the flange portions 12b of the side brackets 12 provided at the both-side ends of the beam member 11 is set to be shorter than the distance Lt between the attachment portions 3a, 3b, and the vehicle-outward end portion of the length-adjustable fastening member 21 in a state in which the length of the length-adjustable nut 21b is set to be short and the vehicle-outward end portion of the extension portion 11d are arranged substantially at the same position in the vehicle width direction. Thereby, by arranging the side bracket 12 to contact the hinge pillar 3 provided on the driver-seat side Wd in a state in which the steering member 10 is disposed at a specified installment position, the gap X1 is ensured between the passenger-seat-side attachment point 3b of the hinge pillar 3 provided on the passenger-seat side Wp and the vehicle-outward end portion of the length-adjustable fastening member 21 or the vehicle-outward end portion of the extension portion 11, so that the installment of the steering member 10 to the vehicle can be improved.

Further, even in a case in which the gaps X, X1 for improving the vehicle installment are formed like this, since the extension portion 11d is provided at the end portion of the passenger-seat side Wp of the steering member 10, it can be prevented properly that the steering member 10 moves toward the passenger-seat side Wp and also it can be prevented properly that the steering member 10 bends vehicle rearward Herein, since the plate member 34 extending in the vehicle width direction between the hinge pillar inner 31 and the hinge pillar outer 32 which constitute the hinge pillar 3 is provided at the specified position of the passenger-seat-side attachment point 3b of the hinge pillar 3 which overlaps the extension portion 11d at least partially in the vehicle side view, the rigidity of the hinge pillar 3 which constitutes the passenger-seat-side attachment point 3b increases. For example, the deformation of the hinge pillar 3 caused by the vehicle frontal collision can be prevented, and the load in a case in which the hinge pillar 3 falls down inward can be inputted to the steering member 10 efficiently, so that the efficient load input to the weak portion 18 can be promoted.

Further, the center stay 15 to fix the steering member 10 to the vehicle-body floor is provided to extend over the taper portion 11c of the beam member 11, and the reinforcing member 15 extending in the vehicle width direction W from the center stay 15 to the small-diameter pipe 11b is provided. Thereby, the steering member 10 can be reinforced efficiently by reinforcing the taper portion 11c which is located at the central position, in the vehicle width direction W, of the steering member 10 and becomes a support point of its bending to be the most easily bendable when receiving the load input caused by the falling down inward of the hinge pillar 3 or the like in the vehicle frontal collision, for example. Accordingly, without reinforcing the other portion excessively, it can be prevented properly that the steering member 10 moves toward the passenger-seat side Wp, and also it can be prevented properly that the steering member 10 bends vehicle rearward.

Additionally, since the lateral hole portion 18b extending in the vehicle width direction W and the vertical hole portions 18a extending in the vertical sectional direction are provided as the above-described weak portion 18 formed at the beam member 11, starting of bending of the beam member 11 can be promoted by the vertical hole portions 18a, and bending of the weak portion 18 can be efficient by adjusting the amount of deformation of the beam member 11 with the lateral hole portion 18b, so that the weak portion 18 is made to bend efficiently. Accordingly, the steering member 10 can be prevented from bending vehicle rearward with the support point located near the center stay 15, and the weak portion 18 bends efficiently, so that it can be properly prevented that the steering member 10 bends vehicle rearward.

The steering support portion of the present invention corresponds to the steering bracket 14 of the above-described embodiment. Likewise, the vehicle-body side portion corresponds to the hinge pillar 3, the distance between the side brackets in the vehicle width direction corresponds to the distance Lf between the flange portions 12b of the side brackets 12, the length-adjustable means corresponds to the length-adjustable nut 21b, the fastening member corresponds to the length-adjustable fastening member 21, the inner wall corresponds to the hinge pillar inner 31, the outer wall corresponds to the hinge pillar outer 32, the plate portion corresponds to the plate member 34, the stay member corresponds to the center stay 15, the large-diameter pipe corresponds to the large-diameter pipe portion 11a, and the small-diameter pipe corresponds to the small-diameter pipe portion 11b. However, the present invention should not be limited to the above-described embodiment, and any other modifications or improvements may be applied within the scope of a sprit of the present invention.

For example, while the end portion of the passenger-seat side Wp of the small-diameter pipe portion 11b of the beam member 11 is configured to project toward the outward side OUT in the vehicle width direction beyond the flange portion 12b of the side bracket 12 in the above-described embodiment, it may be configured such that the flange portion 12b is positioned on the outward side OUT in the vehicle width direction relative to the end face of the extension portion 11d according to a specific shape of the assistant-seat-side attachment point 3b.

Also, while the extension portion 11d is constituted by the end portion of the beam member 11 which projects toward the outward side OUT in the vehicle width direction beyond the flange portion 12b of the side bracket 12 by attaching the side bracket 12 via the attachment portion 12a to the portion of the passenger-seat side Wp of the small-diameter pipe portion 11b which is located at the specified distance on the vehicle inward side IN away from the end face of the passenger-seat side Wp, this extension portion 11d may be constituted by attaching the side bracket 12 to the end portion of the passenger-seat side Wp of the small-diameter pipe portion 11b and by arranging another member having a strength equivalent to or greater than that of the beam member 11 at a position on an extension line of the beam member 11 which is located on the outward side OUT in the vehicle direction of the side bracket 12.

Moreover, it may be configured such that the extension portion 11d is in a contact state with the hinge pillar 3 in its attachment state as long as the extension portion 11d can contact so that the deformation of the side bracket can be prevented or the deformation of the weak portion 18 can be promoted when the hinge pillar 3 retreats or deforms, falling down inward, in the offset collision or the like.

What is claimed is:

1. A front vehicle-body structure of a vehicle, comprising a steering device provided with an airbag; and
a steering member extending in a vehicle width direction and supporting the steering device,
wherein said steering member comprises a beam member extending in the vehicle width direction, a steering support portion supporting said steering device, and a pair of side brackets provided at both-side ends of the beam member and fixed to a pair of vehicle-body side portions,
said beam member includes a weak portion and an extension portion, the weak portion being provided between said steering support portion and a driver-seat-side side bracket of said pair of side brackets and configured to be weak against a load inputted, in a vehicle longitudinal direction, to a driver-seat-side vehicle-body side portion of said pair of vehicle-body side portions, the extension portion being provided to extend toward a vehicle outward side beyond a passenger-seat-side side bracket of said pair of side brackets and configured to prevent said steering member receiving said input load from sliding toward a passenger-seat side by contacting a passenger-seat-side vehicle-body side portion,
a distance in the vehicle width direction between said pair of side brackets is configured to be shorter than that between said pair of vehicle-body side portions, said passenger-seat-side side bracket is fixedly fastened to the passenger-seat-side vehicle-body side portion by using a fastening member having a length adjustable means, and a vehicle-outward end portion of said fastening member in a state in which a length of the length adjustable means is shortened the most and a vehicle-outward end portion of said extension portion are arranged substantially at the same position in the vehicle width direction.

2. The front vehicle-body structure of a vehicle of claim 1, wherein said weak portion is constituted by combination of a lateral hole portion extending in the vehicle width direction and a vertical hole portion extending in a vertical sectional direction.

3. The front vehicle-body structure of a vehicle of claim 1, wherein a plate portion extending in the vehicle width direction between an inner wall and an outer wall which constitute the passenger-seat-side vehicle-body side portion is provided at a specified position which overlaps said extension portion at least partially in a vehicle side view.

4. The front vehicle-body structure of a vehicle of claim 2, wherein a plate portion extending in the vehicle width direction between an inner wall and an outer wall which constitute the passenger-seat-side vehicle-body side portion is provided at a specified position which overlaps said extension portion at least partially in a vehicle side view.

5. The front vehicle-body structure of a vehicle of claim 1, wherein a stay member to fix said steering member at a vehicle-body floor is provided at a middle portion, in the vehicle width direction, of the steering member, said beam member comprises a large-diameter pipe arranged on a driver-seat side and a small-diameter pipe arranged on the passenger-seat side, said stay member is fixed to the said large-diameter pipe, and a reinforcing member extending in the vehicle width direction from the stay member to the said small-diameter pipe is provided.

6. The front vehicle-body structure of a vehicle of claim 2, wherein a stay member to fix said steering member at a vehicle-body floor is provided at a middle portion, in the vehicle width direction, of the steering member, said beam member comprises a large-diameter pipe arranged on a driver-seat side and a small-diameter pipe arranged on the passenger-seat side, said stay member is fixed to the said large-diameter pipe, and a reinforcing member extending in the vehicle width direction from the stay member to the said small-diameter pipe is provided.

7. The front vehicle-body structure of a vehicle of claim 3, wherein a stay member to fix said steering member at a vehicle-body floor is provided at a middle portion, in the vehicle width direction, of the steering member, said beam member comprises a large-diameter pipe arranged on a driver-seat side and a small-diameter pipe arranged on the passenger-seat side, said stay member is fixed to the said large-diameter pipe, and a reinforcing member extending in the vehicle width direction from the stay member to the said small-diameter pipe is provided.

8. A front vehicle-body structure of a vehicle, comprising a steering device provided with an airbag; and
a steering member extending in a vehicle width direction and supporting the steering device,
wherein said steering member comprises a beam member extending in the vehicle width direction, a steering support portion supporting said steering device, and a pair of side brackets provided at both-side ends of the beam member and fixed to a pair of vehicle-body side portions,
said beam member includes a weak portion and an extension portion, the weak portion being provided between said steering support portion and a driver-seat-side side bracket of said pair of side brackets and configured to be weak against a load inputted, in a vehicle longitudinal direction, to a driver-seat-side vehicle-body side portion of said pair of vehicle-body side portions, the extension portion being provided to extend toward a vehicle outward side beyond a passenger-seat-side side bracket of said pair of side brackets and configured to prevent said steering member receiving said input load from sliding toward a passenger-seat side by contacting a passenger-seat-side vehicle-body side portion,
a distance in the vehicle width direction between said pair of side brackets is configured to be shorter than that between said pair of vehicle-body side portions, said passenger-seat-side side bracket is fixedly fastened to the passenger-seat-side vehicle-body side portion by using a fastening member having a length adjustable means, and a vehicle-outward end portion of said fastening member in a state in which a length of the length adjustable means is shortened the most and a vehicle-outward end portion of said extension portion are arranged substantially at the same position in the vehicle width direction,
said weak portion is constituted by combination of a lateral hole portion extending in the vehicle width direction and a vertical hole portion extending in a vertical sectional direction,
a plate portion extending in the vehicle width direction between an inner wall and an outer wall which constitute the passenger-seat-side vehicle-body side portion is provided at a specified position which overlaps said extension portion at least partially in a vehicle side view,
a stay member to fix said steering member at a vehicle-body floor is provided at a middle portion, in the vehicle width direction, of the steering member, said beam member comprises a large-diameter pipe arranged on a driver-seat side and a small-diameter pipe arranged on the passenger-seat side, said stay member is fixed to the said large-diameter pipe, and a reinforcing member extending in the vehicle width direction from the stay member to the said small-diameter pipe is provided.

* * * * *